(12) United States Patent
Kimura et al.

(10) Patent No.: US 6,442,862 B1
(45) Date of Patent: Sep. 3, 2002

(54) DISPLACEMENT MEASURING APPARATUS

(75) Inventors: Kazuaki Kimura; Jun Sasagawa; Yohei Ogawa; Yasutaka Katayama; Shuichi Sasaki, all of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/521,608

(22) Filed: Mar. 9, 2000

(30) Foreign Application Priority Data

Mar. 15, 1999 (JP) .......................................... 11-067650

(51) Int. Cl.⁷ .............................. G01B 3/12; G01B 3/10
(52) U.S. Cl. ........................................... 33/732; 33/735
(58) Field of Search ................. 33/732, 1 PT, 33/1 LE, 700, 701, 712, 733, 734, 735, 738, 743, 744, 746, 754, 755, 756, 413

(56) References Cited

U.S. PATENT DOCUMENTS

| | | | |
|---|---|---|---|
| 3,747,218 A | * | 7/1973 | Bell .............................. 33/734 |
| 4,688,555 A | | 8/1987 | Wardle |
| 4,903,536 A | | 2/1990 | Salisbury, Jr. et al. |
| 6,176,018 B1 | * | 1/2001 | Wiklund ....................... 33/503 |
| 6,253,461 B1 | * | 7/2001 | Fisher .......................... 33/732 |

FOREIGN PATENT DOCUMENTS

| | | |
|---|---|---|
| GB | 2 045 196 A | 10/1980 |
| WO | 98/21794 | 5/1998 |

OTHER PUBLICATIONS

Patent Abstract of Japan, vol. 2000, No. 05, Sep. 14, 2000, Appl. No. 10211326.
European Search Report, Nov. 7, 2001.

* cited by examiner

*Primary Examiner*—Christopher W. Fulton
(74) *Attorney, Agent, or Firm*—Foley & Lardner

(57) ABSTRACT

A displacement measuring appparatus is small in size and hence capable of avoiding interference with other units and further has its measurement accuracy hardly deteriorated. There are disposed pulleys for movement with respect to the body of the appartus and there is disposed an energizing means such that the pulleys are subjected to the energizing force. A wire is passed around the pulleys. When the wire is subjected to a pulling force, the pulleys are moved against the energizing force of the energizing means.

12 Claims, 8 Drawing Sheets

DISPLACEMENT MEASURING APPARATUS

FIELD OF THE INVENTION

The present invention relates to an apparatus for measuring displacement by utilizing a wire.

RELATED ARTS

Conventionally, as an apparatus for measuring a displacement along the stroke of a cylinder, there is known an apparatus that uses an encoder and a wire taken up by a coil spring.

The wire is taken up by a pulley constituting a take up portion. The pulley is energized by the coil spring in the direction in which the wire is taken up. A displacement along the stroke of the cylinder is measured by the direction and amount of rotation of the pulley.

There is, however, a demerit with the use of the conventional displacement measuring apparatus that the size of the pulley around its axis becomes large. Therefore, there has been a danger that the apparatus becomes larger according as the measured distance is increased and it interferes with other units.

Further, there has been such a problem that a coil spring is not durable, i.e., when it is expanded and contracted repeatedly, its elasticity becomes poor resulting in deterioration in the measurement accuracy.

When the measurement is carried out only by the use of an encoder, it has been difficult for a conventional apparatus to secure improved accuracy in measuring the distance.

SUMMARY OF THE INVENTION

It is a primary object of the present invention to provide a displacement measuring apparatus smaller in size so that its interference with other units is avoided.

It is another object of the present invention to provide a measuring apparatus of which the measurement accuracy does not deteriorate easily.

A displacement measuring apparatus according to the invention is an apparatus for measuring displacement by utilizing a wire. There is movably disposed a pulley. There is disposed an energizing means such that the pulley is moved under the energizing force. A wire is passed around the pulley. When the wire is let in or let out, the pulley is moved against the energizing force of the energizing means.

A linear sensor may be disposed in the displacement measuring apparatus so that the let out amount or let in amount of the wire is measured by the linear sensor.

An encoder may be disposed in the above displacement measuring apparatus so that the let out amount or let in amount of the wire may also be measured by the encoder.

In the displacement measuring apparatus according to the invention, there is movably disposed a pulley in the body of the apparatus. It is preferred that a plurality of pulleys are used as a unit. There is disposed an energizing means (for example a spring) such that the pulleys are moved under the energizing force. A wire is passed around the pulleys. When the wire is led into or taken out of the body of the apparatus, the pulleys are moved against the energizing force of the energizing means.

Preferably, there is provided a linear sensor in the displacement measuring apparatus such that the let out amount or let in amount of the wire is measured by the linear sensor.

More preferably, there is disposed an encoder in the displacement measuring apparatus provided with the linear sensor so that the let out amount or let in amount of the wire is measured not only by the linear sensor but also by the encoder.

The displacement measuring apparatus configured as described above can be used as a displacement measuring apparatus of a cylinder used in a heavy machine such as a shovel-car.

In the above described case, it is possible that a linear displacement of the pulleys in the body is measured with the linear sensor to obtain the let out amount of the wire as a coarse measurement and the angle of rotation of the encoder is measured as a fine measurement. Thus, it is preferred that the two measurements with the encoder and the linear sensor be combined.

In measuring a linear displacement by means of the linear sensor, it is preferred, in terms of durability and cost, to carry out the measurement utilizing changes in the resistance value with the use of a conducting plastic member.

DESCRIPTION OF THE PREFERRED EMBODIMENTS

Embodiments of the present invention will be described with reference to the accompanying drawings.

Figure 1:
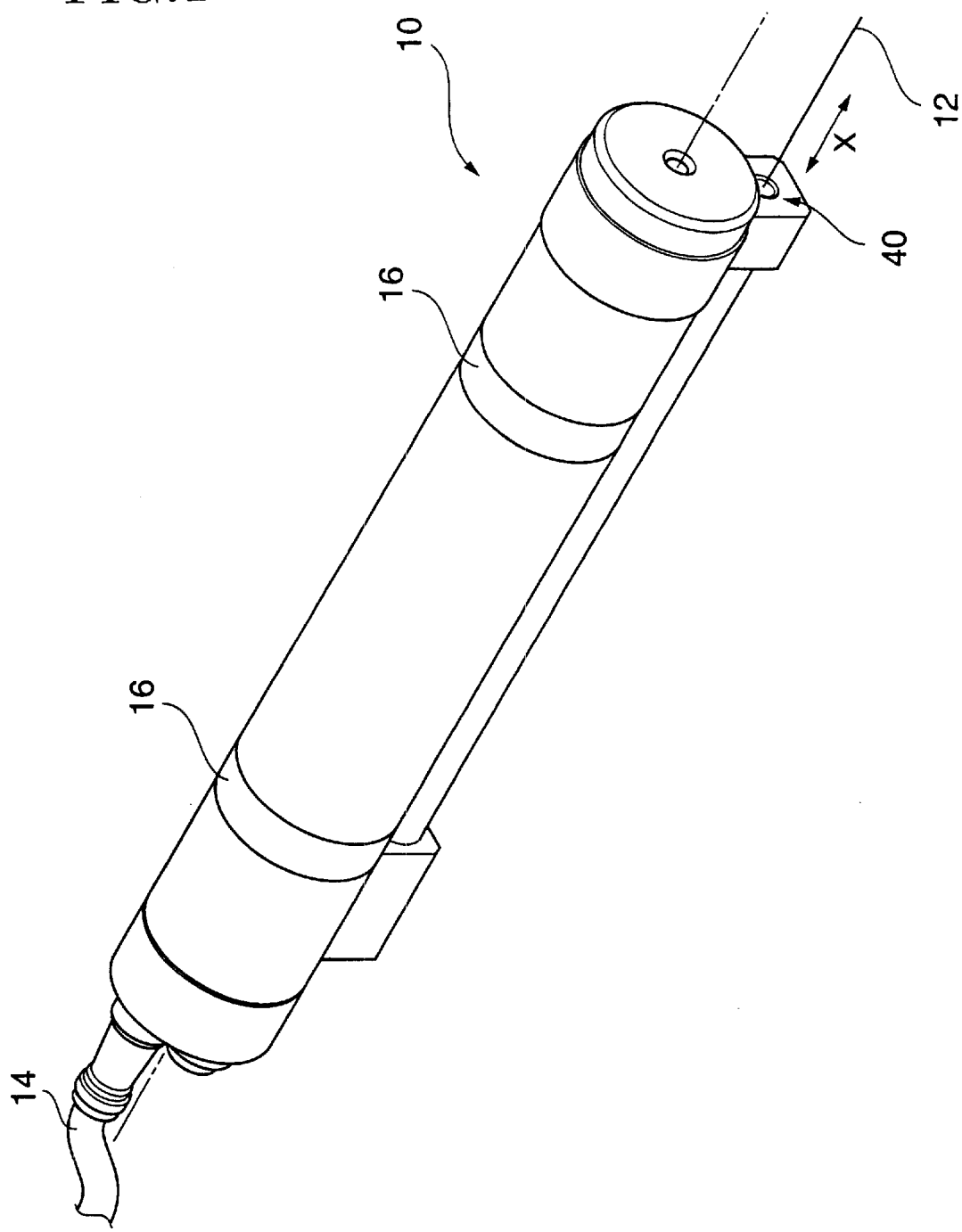
FIG. 1 is an external view of a displacement measuring apparatus according to the invention.

FIG. 1 is a view showing an external appearance of the displacement measuring apparatus according to an embodiment of the invention.

The displacement measuring apparatus 10 is capable of measuring the amount of the wire 12 led into or taken out of the body of the apparatus. The measured amount of the wire 12 led into or taken out of the body of the apparatus can be converted into an electrical signal. The measured value converted into the electrical signal is transmitted to another apparatus through a cable 14.

Fixing belts 16 are used for fixing the displacement measuring apparatus 10 onto another apparatus.

Figure 2:
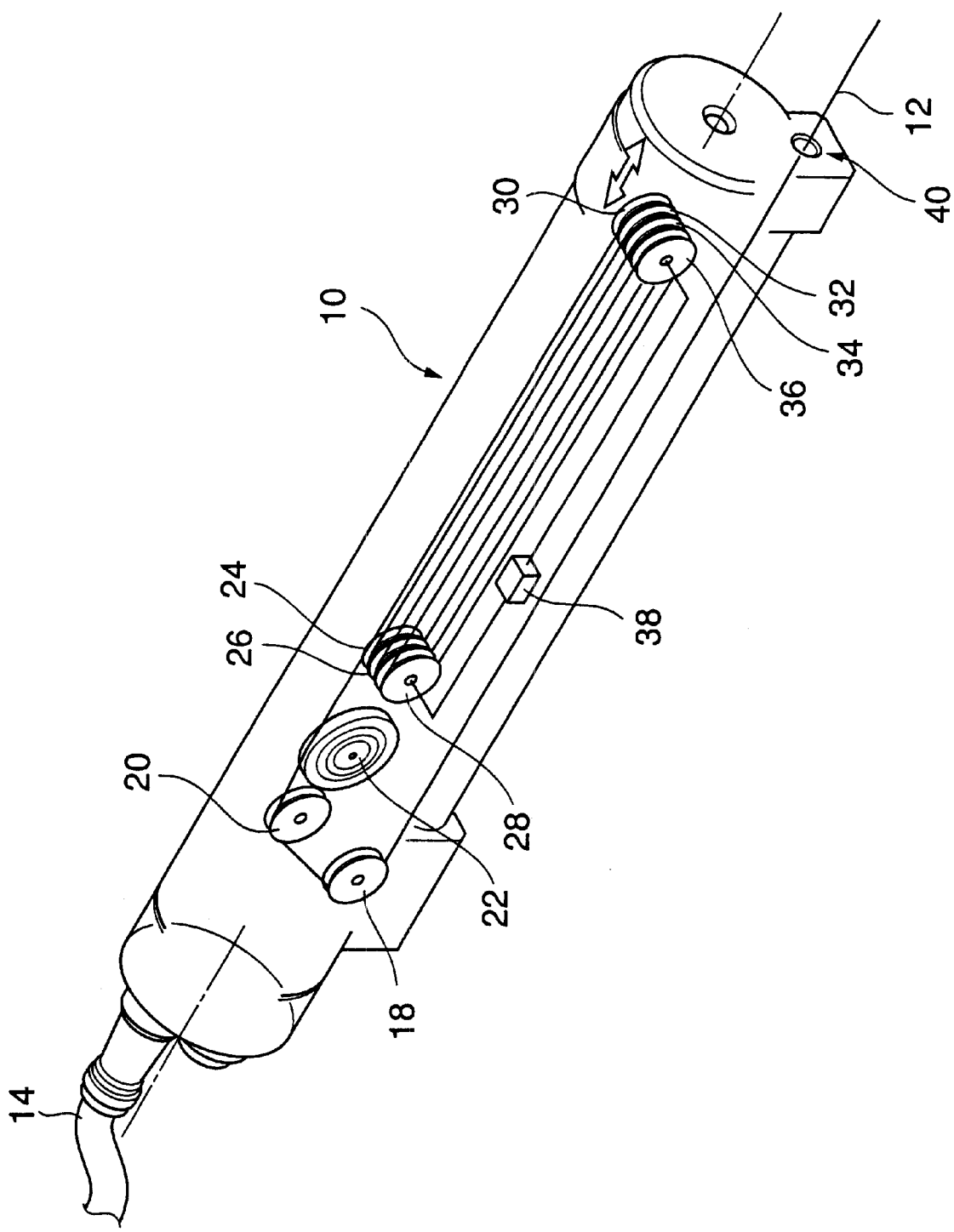
FIG. 2 is a diagram schematically showing the displacement measuring apparatus of the invention.

FIG. 2 is a schematic diagram of the displacement measuring apparatus 10.

The displacement measuring apparatus 10 is provided with transmission pulleys 18, 20, an encoder 22, fixed pulleys 24, 26, 28, movable pulleys 30, 32, 34, 36, and a linear sensor (line sensor) 38. Further, a common wire 12 is passed around all the above elements.

The transmission pulleys 18 and 20 are capable of transmitting the wire 12 to other elements. The encoder 22 allows measurement to be made by its amount of rotation. The fixed pulleys 24, 26, and 28 are fixed to the body of the displacement measuring apparatus 10.

The movable pulleys 30, 32, 34, and 36 are movable in the directions of the arrowheads indicated in FIG. 2. The linear sensor 38 is disposed between the movable pulleys and the fixed pulleys. The linear sensor allows the movement (displacement) of the movable pulleys 30, 32, 34, and 36 in the direction X to be measured by a change in the resistance value.

Figure 3:
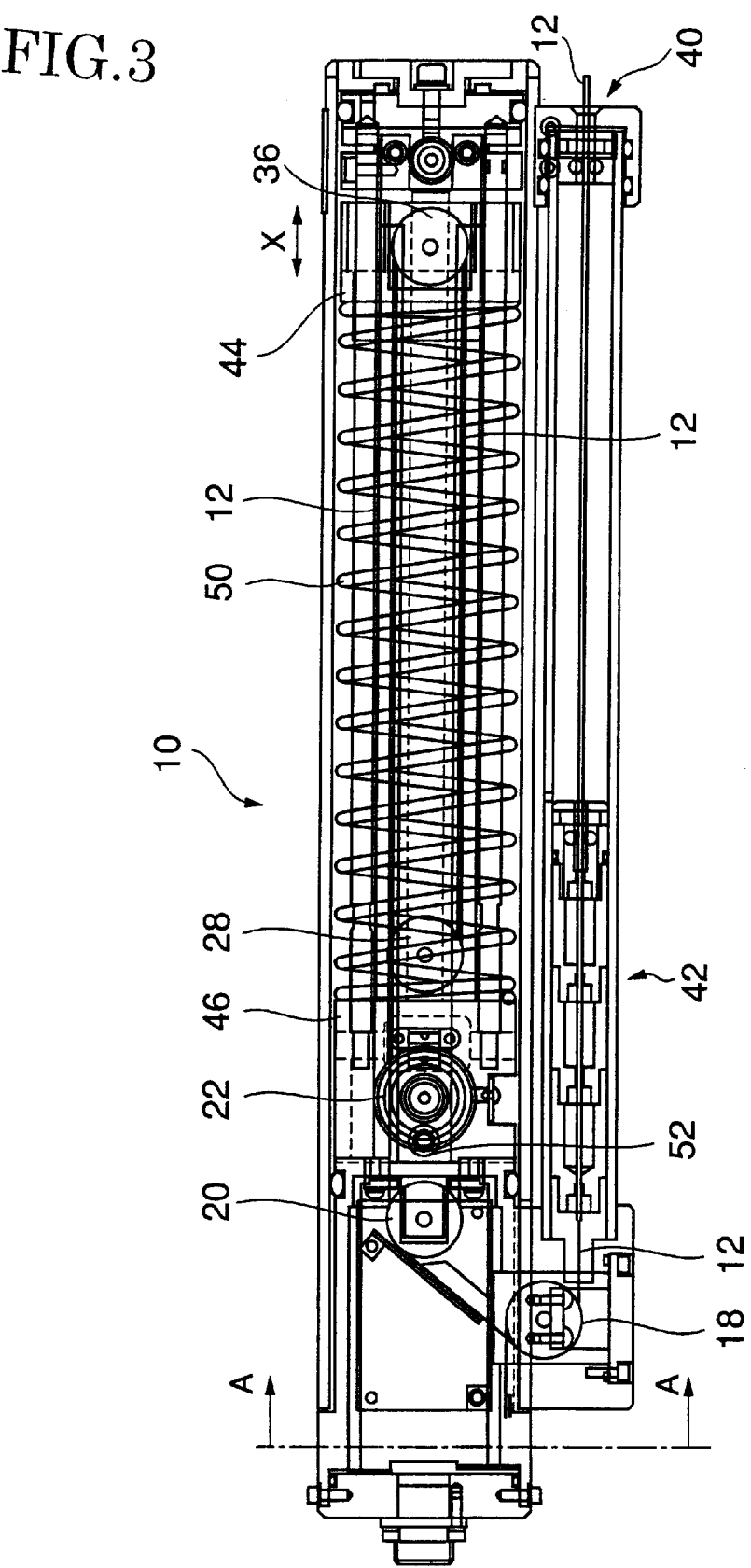
FIG. 3 is a sectional view of the displacement measuring apparatus shown in FIG. 1 in the vertical direction.

FIG. 3 is a sectional view of the displacement measuring apparatus of FIG. 1 in the vertical direction.

The wire 12 is allowed to pass through the led-out 40 and pass through the clean region 42. In the clean region 42, the wire 12 can be made clean of foreign objects and mud attached thereto. The wire 12 can also be coated with a resin or the like so that a clogging is prevented. Scraping the foreign matters off the rope can also be achieved by an O-ring made of a resin or the like. As the wire 12, that having a diameter of 1.5 mm, the wire being 1.0 mm and the coating being 0.5 mm, can be used.

Further, the displacement measuring apparatus 10 may be provided with a sealed oil reservoir so that moisture is removed. Thereby, the apparatus is rendered more maintenance-free than before.

Figure 4:
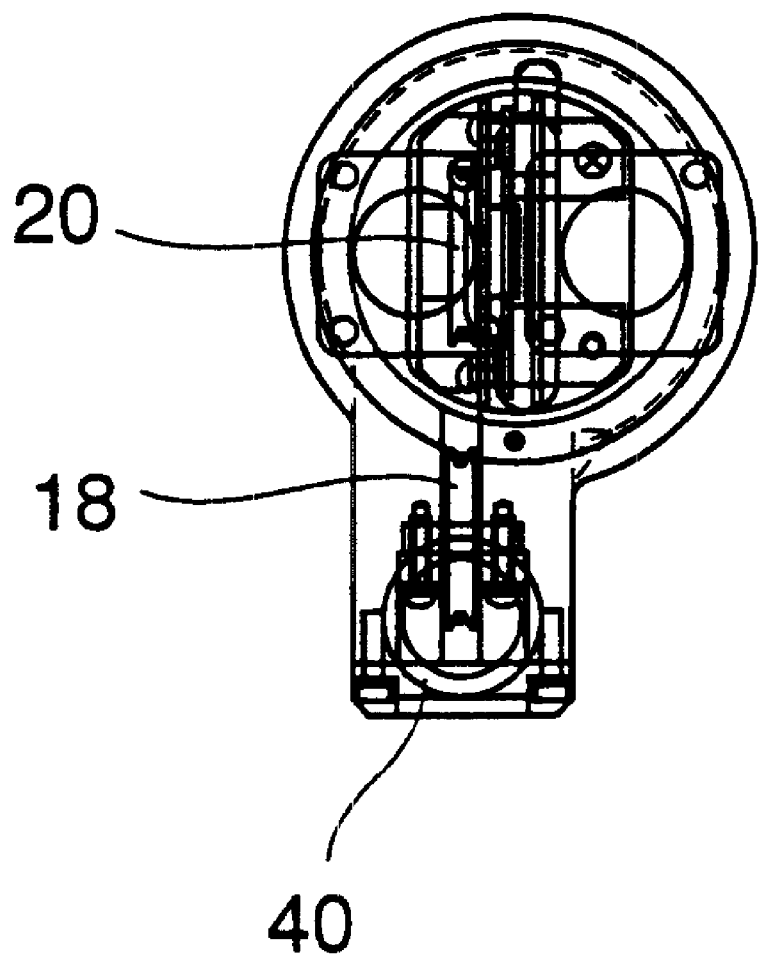
FIG. 4 is a view of the displacement measuring apparatus in the direction of the arrows A—A in FIG. 3.

FIG. 4 is a view in the direction of the arrows A—A in FIG. 3.

The wire 12 passed through the clean region 42 reaches the transmission pulley 20 through the transmission pulley 18. The wire 12 arrived at the transmission pulley 20 is passed around the encoder 22.

Figure 5:
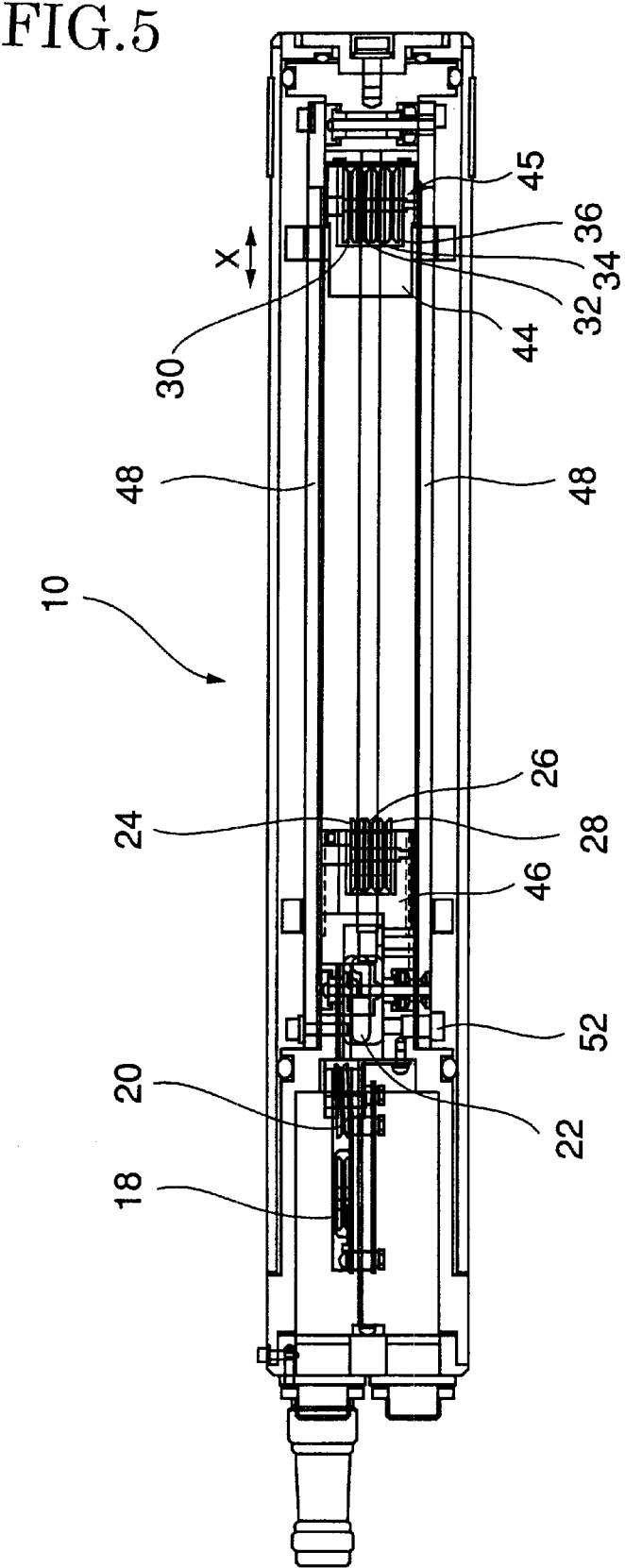
FIG. 5 is a sectional view of the displacement measuring apparatus shown in FIG. 1 in the horizontal direction.

FIG. 5 is a sectional view in the horizontal direction of the displacement measuring apparatus shown in FIG. 1.

The wire 12 passed around the encoder 22 is passed around the pulley 30. The wire 12 passed around the pulley 30 is passed around the fixed pulley 24. The wire 12 passed around the fixed pulley 24 is passed around the movable pulley 32. The wire 12 passed around the movable pulley 32 is passed around the fixed pulley 26. The wire 12 passed around the fixed pulley 26 is passed around the movable pulley 34. The wire 12 passed around the movable pulley 34 is passed around the fixed pulley 28. The wire 12 passed around the fixed pulley 28 is passed around the movable pulley 36. The wire 12 passed around the movable pulley 36 is fixed at its one end to a pulley supporting member 44.

The movable pulleys 30, 32, 34, and 36 are rotatably supported by a pulley energizing portion 45 provided on the pulley supporting member 44. The pulley supporting member 44 is capable of moving in the directions of the arrowheads X in FIG. 5 along a guide 48. The fixed pulley 24, 26, and 28 are rotatably supported by a fixing member 46.

As shown in FIG. 3, there is disposed a spring 50 between the pulley supporting member 44 and the fixing member 46 so that the movable pulleys 30, 32, 34, and 36 are given an energizing force through the pulley supporting member 44 (the spring 50 is not shown in FIG. 2 and FIG. 4 to simplify the illustration). The spring 50 is an example of energizing means.

Now the operation will be described.

When the other end of the wire 12 is subjected to a pulling force, the wire 12 is activated to move the pulley supporting member 44. With the movement of the pulley supporting member 44, the movable pulleys 30, 32, 34, and 36 also move. Here, since the shifted amount or displacement of each of the movable pulleys 30, 32, 34, and 36 is small as compared with the let out amount of the wire 12, durability of the energizing portion 45 for energizing the movable pulleys 30, 32, 34, and 36 and the pulley supporting member 44 is improved.

Now, referring to FIG. 2 and FIG. 3, the method of measuring the let out amount of the wire will be described.

As described above, when the wire 12 is subjected to a pulling force, the wire 12 is led out of the measuring apparatus 10 through the led-out 40. The tension to the wire 12 is transmitted through the pulleys so that the pulley supporting member 44 is moved in the directions of the arrowheads in FIG. 3 against the energizing force of the spring 50. The linear sensor 38 detects a change in the resistance value so that the shifted amount of the pulley supporting member 44 is detected. By the measurement of the shifted amount of the pulley supporting member 44, the let out amount of the wire 12 with respect to the body of the apparatus 10 can be measured. In some case, the encoder 22 may be used instead of the linear sensor 38 to measure the let out amount of the wire 12.

In the displacement measuring apparatus of the invention, the encoder 22 for making incremental measurement may be used in addition to the linear sensor 38 which makes absolute measurement, so that the let out amount of the wire 12 is measured by "pseudo-absolute". Since the let out amount of the wire 12 can be measured more finely by means of the encoder 22, combination of it with the linear sensor 38 allows more precise measurement of the let out amount to be made without changing the measurable let out amount of the wire 12.

When the encoder 22 is used, light is picked up by a pick-up device 52 to thereby measure the angle of rotation of the encoder 22. By detecting the angle of rotation of the encoder 22 by passing the wire 12 around the encoder 22, the let out amount of the wire 12 can be measured.

Now, another embodiment of the present invention will be described.

When a wire is passed around the encoder directly, it is considered that the wire sometimes slips.

For example, when severe letting out or delivery of the wire is repeated, or when water, mud, and the like attaching to the wire are not completely cleaned off, the wire slips at the portion where it is passed around so that the movement of the wire becomes unable to be accurately represented by the encoder.

Then, by converting the shifted amount of the "pulley supporting member" supporting the movable pulleys into a rotating operation of the encoder by means of a non-slip timing belt, it becomes possible to accurately measure the delivered amount not affected by severe delivery or dirt on the wire.

The timing belt here is such a belt that is made of a resin with recesses and protrusions regularly formed thereon. By using the timing belt together with a timing belt pulley formed so as to engage the recesses and protrusions on the belt, the slip between the belt and the pulley can be prevented.

Figure 7:
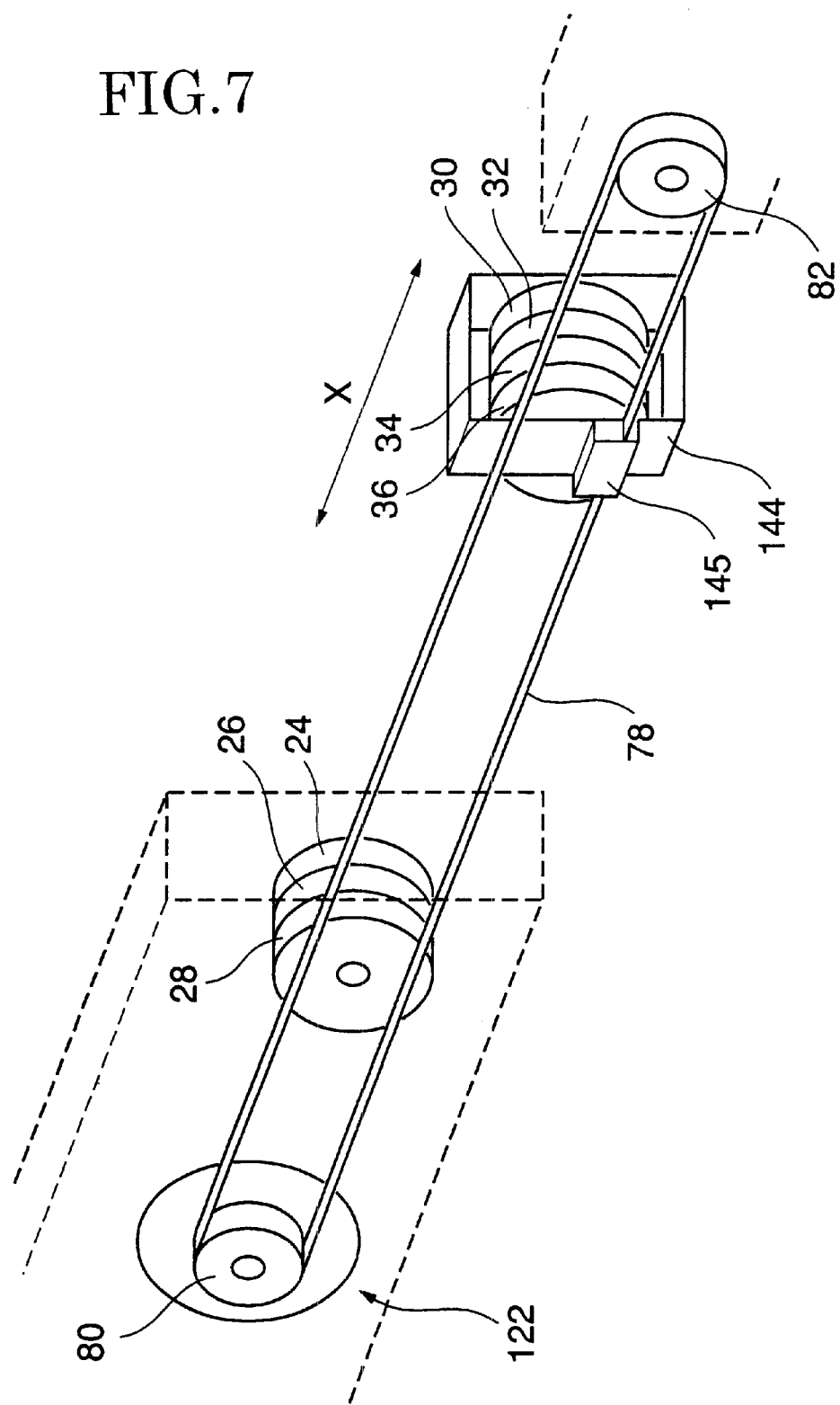
FIG. 7 is a diagram schematically showing a mechanism for transmitting the let out amount or let in amount of the wire to the encoder according to another embodiment.
Figure 8:
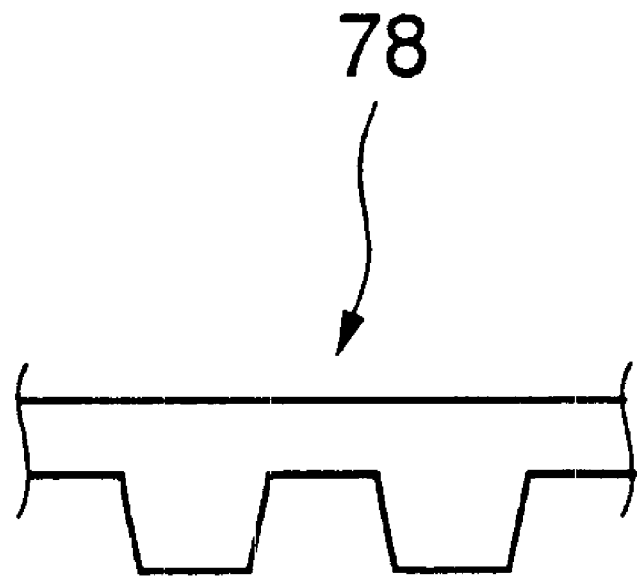
FIG. 8 is a view partly showing an enlarged timing belt.

Referring now to FIG. 7 and FIG. 8, another embodiment will be described.

FIG. 7 is a schematic diagram showing a mechanism for transmitting the let out amount of the wire to the encoder, as another embodiment of the present invention. FIG. 8 is a diagram partly showing an enlarged timing belt.

The mechanism for transmitting the let out amount of the wire 12 to the encoder 122 is formed of timing belt pulleys 80, 82, a timing belt 78, and pulley supporting member 144. To the pulley supporting member 144 are attached movable pulleys 30, 32, 34, and 36. By letting out or letting in the wire 12 thereby moving the movable pulleys 30, 32, 34, and 36, the pulley supporting member 144 is moved in the directions of the arrowheads X.

The timing belt pulley 80 is attached to the encoder 122. The timing belt pulley 82 is rotatably attached to the displacement measuring apparatus.

As shown in FIG. 7, the timing belt 78 is passed around the timing belt pulleys 80, 82. The timing belt 78 is provided with regular recesses and protrusions as shown in FIG. 8. The timing belt pulleys 80 and 82 are formed so as to engage the timing belt 78. The pulley supporting member 144 is provided with a belt fixing portion 145. The belt fixing portion 145 is fixed to a portion of the timing belt 78.

Since the mechanism for letting out or letting in the wire is configured as described above, when the pulley supporting member 144 is moved in the directions X, the shifted amount is converted into the rotated amount of the encoder by means of the timing belt 78 and the timing pulley 80.

Since, here, the timing belt 78 and the timing belt pulleys 80 and 82 are arranged to engage with each other, no slippage occurs.

Therefore, accurate let out amount or let in amount of the wire 12 can be measured not affected by severe letting out or letting in of the wire or dirt on the wire.

The displacement measuring apparatus of the present invention can be applied to various types of displacement measurement. For example, the displacement measuring apparatus according to the invention can be used as a displacement measuring apparatus of the stroke of a hydraulic cylinder of heavy machinery.

Figure 6:
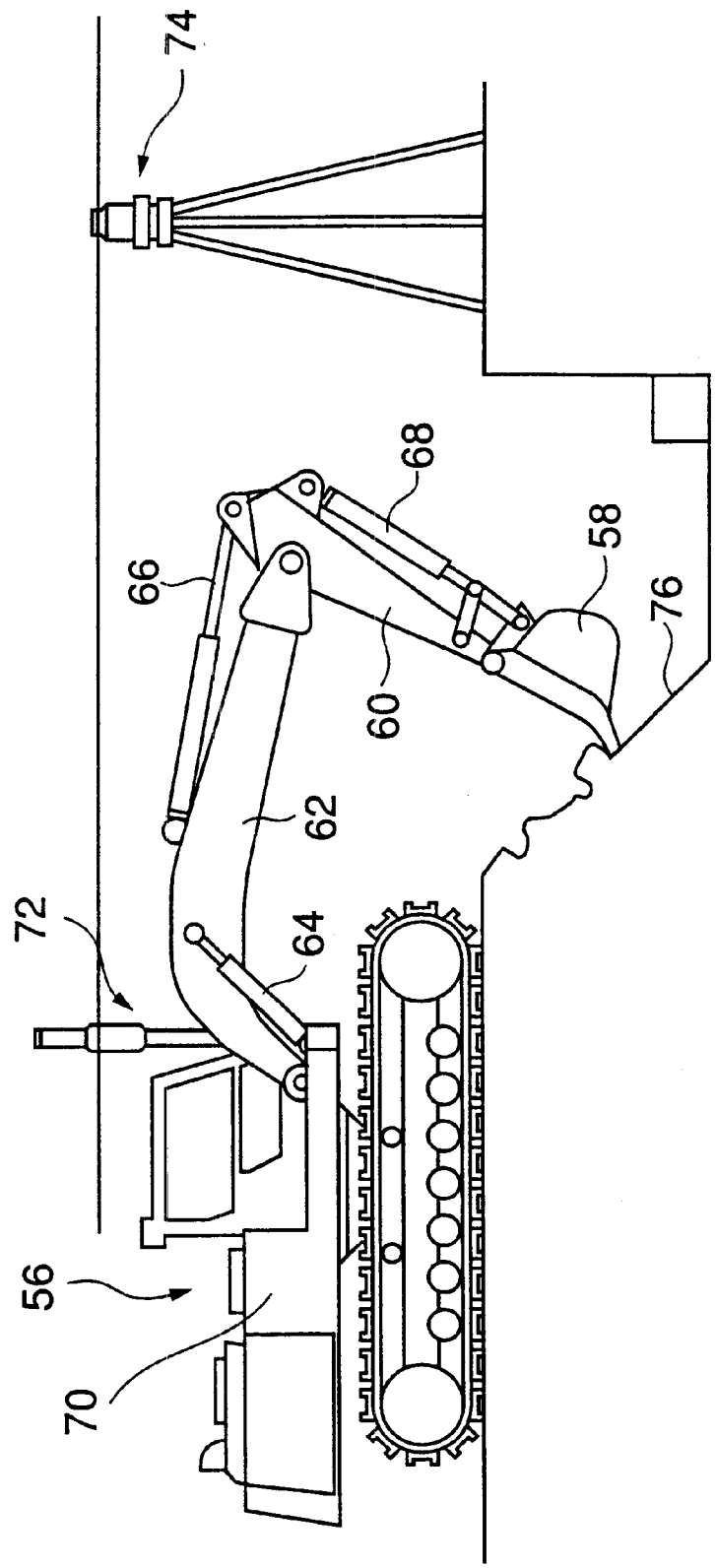
FIG. 6 is a diagram showing a shovel-car (heavy machine) on which the displacement measuring apparatus of the invention is installed.

FIG. 6 is a diagram showing an example of an shovel-car (heavy machine) provided with the displacement measuring apparatus of the invention.

A ground reveling tool (bucket) 58 of such a machine as an excavator (shovel-car) 56 is supported by a stick 60 and a boom 62 for rotation in specific directions and operated by cylinders 64, 66, and 68 each of which is extended and retracted by hydraulic pressure.

In order to make ground reveling according to a predetermined grounding plan, it is required to control the position and attitude of the bucket 58, and to achieve this, it becomes necessary to detect relative angles between the bucket 58 and the stick 60 supporting the same, the stick 60 and the boom 62 supporting the same, and the boom 62 and the construction machine 56 supporting the same.

The angle at a joint portion can be obtained by measuring the lengths of the three sides of the triangle including the fulcrum at each joint.

Therefore, in order to control the position and attitude of the bucket, it is required to measure displacement of the hydraulic cylinders.

Referring now to FIG. 6, an embodiment of a shovel-car with a displacement measuring apparatus of the invention attached thereto will be described.

The shovel-car 56 is made up of the shovel-car body 70, boom 62, stick (arm) 60, and the bucket 58. The hydraulic cylinder 64 is disposed between the shovel-car body 70 and the boom 62. The hydraulic cylinder 66 is disposed between the boom 62 and the stick 60. The hydraulic cylinder 68 is disposed between the stick 60 and the bucket 58. The hydraulic cylinder 64 extends and retracts the cylinder rod so as to move the boom 62. The hydraulic cylinder 66 extends and retracts the cylinder rod so as to move the stick 60. The hydraulic cylinder 68 extends and retracts the cylinder rod so as to move the bucket 58.

To the shovel-car body 70 is attached a level sensor 72. On the ground surface 76 near the shovel-car 56, there is disposed a rotating laser 74. A laser beam from the rotating laser 74 is sensed by a level sensor 72. The level sensor 72 sensing the laser beam from the rotating laser 74 is capable of level setting or gradient setting.

In the shovel-car 56 configured as described above, the displacement measuring apparatus of the invention can be installed on each of the hydraulic cylinders 64, 66, and 68. Namely, each of them can use the displacement measuring apparatus as a boom sensor, a stick sensor (arm sensor), and a bucket sensor.

The displacement measuring apparatus of the invention can be made into a smaller and narrower form, and hence it is easy to install and interference of the apparatus with other portion of the shovel-car 56 can be avoided. Therefore, the stroke amount (i.e., displacement) of each of the hydraulic cylinders 64, 66, and 68 can be easily measured by the displacement measuring apparatus of the invention. As described above, the relative angle between the shovel-car body 70 and the boom 62, the relative angle between the boom 62 and the stick 60, and the relative angle between the stick 60 and the bucket 58 can be detected from the stroke amount of each hydraulic cylinder (i.e., displacement).

Accordingly, by using the levelness or gradient detected by the level sensor 72 and information of relative angles, it becomes possible to detect and control the position of the bucket 58.

The present invention is not limited to the above described embodiments.

Although a wire is used as a general item in the above described embodiments, a special item other than that may be used.

Further, the linear sensor is not limited to the one of the above described type. An optical line sensor (CCD, LED) may also be used. It is also possible to measure the linear displacement by having a pressure sensor attached to the spring portion.

Further, the present invention is not limited to the mode in which the displacement measuring apparatus is used as the cylinder stroke measuring apparatus. It can be applied to measurement of other displacement. Of course, the invention is not limited to measurement of stroke amount of hydraulic cylinders.

Effects of the invention will be as follows:

According to the displacement measuring apparatus of the present invention, the apparatus can be formed smaller. It is also possible to provide the apparatus in a slender form. The apparatus in a slender form facilitates its installation on, for example, a heavy machine, and avoids its interference with other part. Because of ease of installation, the days required for installation can be decreased.

In the displacement measuring apparatus of the present invention, the displacement of each pulley is small as compared with the let out amount of the wire. In other words, only light load is placed on the energizing portion for energizing the pulleys, and, hence, endurance of the energizing portion is improved. Therefore, accuracy of the displacement measuring apparatus can be prevented from deteriorating.

Further, since a prior art encoder employing a spring is not used in the displacement measuring apparatus of the invention, deterioration of the measurement accuracy due to deterioration in the elasticity of the spring can be avoided.

What is claimed is:

1. A displacement measuring apparatus comprising:

an apparatus body;

a wire which is to be led into or taken out of the apparatus body;

a movable pulley around which the wire is passed in such a manner that, when the pulley is moved relative to the apparatus body, the wire passed around the pulley is led into or taken out of the apparatus body;

means for mechanically energizing the pulley so that the pulley can move-under a mechanically energizing force of the mechanically energizing means; and means for measuring the moved amount of the pulley relative to the apparatus body when the pulley moves.

2. A displacement measuring apparatus according to claim 1, wherein the means for measuring includes a linear sensor for measuring a shifted amount of the pulley.

3. A displacement measuring apparatus according to claim 2, wherein the measuring means includes an encoder for measuring a shifted amount of the pulley.

4. A displacement measuring apparatus according to claim 1, wherein the pulley includes a plurality of pulley elements which are movably disposed, and the wire is a common wire passed around the pulley elements.

5. A displacement measuring apparatus according to claim 1, wherein the mechanically energizing means includes a spring.

6. A wire length measuring device for measuring the length of a wire led into or taken out of the wire length measuring device, the device comprising:

an apparatus body including an orifice for receiving the wire;

a movable pulley positioned within the apparatus body, the wire being passed around said movable pulley such that movement of the pulley relative to the apparatus body corresponds to the wire being led into or taken out of the apparatus body;

a pulley moving device for applying a force on said movable pulley, said force translationally moving said movable pulley within said apparatus body; and a pulley measuring device for measuring said translational movement of said movable pulley.

7. A wire length measuring device according to claim 6, wherein the pulley measuring device comprises a linear sensor for measuring a translationally shifted amount of the movable pulley.

8. A wire length measuring device according to claim 6, wherein the pulley measuring device comprises an encoder for measuring a translationally shifted amount of the pulley.

9. A wire length measuring device according to claim 6, wherein the movable pulley includes a plurality of pulley elements which are movably disposed, and the wire is a common wire passed around the pulley elements.

10. A wire length measuring device according to claim 6, wherein the pulley moving device includes a spring.

11. A method of measuring a length of wire with a wire measuring device, comprising the steps of:

one of leading wire into and taking wire out of said wire measuring device;

passing said wire around a movable pulley such that said movable pulley moves within said wire measuring device in an amount corresponding to an amount of wire lead into or taken out of said wire measuring device;

applying a translational moving force to said movable pulley; and measuring translational movement of said movable pulley.

12. The method according to claim 11, wherein the movable pulley includes a plurality of pulley elements which are movably disposed and the wire is a common wire passed around the pulley elements.

* * * * *